US008818878B2

(12) United States Patent
Derby et al.

(10) Patent No.: US 8,818,878 B2
(45) Date of Patent: Aug. 26, 2014

(54) DETERMINING TAXES IN AN ELECTRONIC COMMERCE SYSTEM

(75) Inventors: Herbert G. Derby, Yorktown Heights, NY (US); Hubert M. Chao, New York, NY (US); Eugene Gluzberg, Great Neck, NY (US); Stephen Stukenborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1035 days.

(21) Appl. No.: 11/426,838

(22) Filed: Jun. 27, 2006

(65) Prior Publication Data

US 2007/0299733 A1 Dec. 27, 2007

(51) Int. Cl.
*G06Q 40/00* (2012.01)
*G06Q 30/04* (2012.01)

(52) U.S. Cl.
CPC ...................................... G06Q 30/04 (2013.01)
USPC ........................................................ 705/26.1

(58) Field of Classification Search
CPC ........................................................ G06Q 30/04
USPC ....................................................... 705/35–40
See application file for complete search history.

(56) References Cited

U.S. PATENT DOCUMENTS

| | | | |
|---|---|---|---|
| 5,889,863 A | 3/1999 | Weber | |
| 5,999,914 A | 12/1999 | Blinn et al. | |
| 6,029,141 A | 2/2000 | Bezos et al. | |
| 6,134,307 A * | 10/2000 | Brouckman et al. | 379/115.03 |
| 6,141,653 A | 10/2000 | Conklin et al. | |
| 6,260,024 B1 | 7/2001 | Shkedy | |
| 6,499,052 B1 | 12/2002 | Hoang et al. | |
| 6,754,636 B1 | 6/2004 | Walker et al. | |
| 6,850,917 B1 | 2/2005 | Hom et al. | |
| 6,876,977 B1 | 4/2005 | Marks | |
| 6,925,444 B1 | 8/2005 | McCollom et al. | |
| 6,934,690 B1 | 8/2005 | Van Horn et al. | |
| 7,013,292 B1 | 3/2006 | Hsu et al. | |
| 7,089,198 B2 * | 8/2006 | Freedenberg et al. | 705/27 |
| 7,197,475 B1 | 3/2007 | Lorenzen et al. | |

(Continued)

FOREIGN PATENT DOCUMENTS

| | | |
|---|---|---|
| JP | 11-250165 | 9/1999 |
| JP | 2002-007904 A | 1/2002 |

(Continued)

OTHER PUBLICATIONS

PCT International Search Report and Written Opinion, PCT/US07/72269, Aug. 14, 2008, 12 Pages.

(Continued)

*Primary Examiner* — Thomas M Hammond, III
(74) *Attorney, Agent, or Firm* — Johnson, Marcou & Isaacs, LLC

(57) ABSTRACT

An electronic commerce system includes a broker that enables customers to purchase items from multiple different merchants. A customer anonymously interacts with the merchants to identify items to purchase, and the merchants provide virtual shopping carts including the item and tax information to the broker. The tax information describes tax rates for the item in multiple jurisdictions. The broker determines the jurisdiction applicable to the customer by, for example, determining a shipping address for the customer. The broker uses the tax information and jurisdiction to calculate the taxes to collect for the item. The broker determines the total cost for the transaction, and conducts an electronic commerce transaction for the item with the customer.

22 Claims, 6 Drawing Sheets

(56) References Cited

U.S. PATENT DOCUMENTS

| | | | |
|---|---|---|---|
| 7,640,193 | B2 | 12/2009 | Crespo et al. |
| 7,647,247 | B2 | 1/2010 | Abraham et al. |
| 7,792,699 | B2 | 9/2010 | Kwei |
| 7,949,572 | B2 | 5/2011 | Perrochon et al. |
| 2001/0007098 | A1 | 7/2001 | Hinrichs et al. |
| 2001/0007099 | A1 | 7/2001 | Rau et al. |
| 2002/0016765 | A1 | 2/2002 | Sacks |
| 2002/0016766 | A1 | 2/2002 | Raja |
| 2002/0052792 | A1* | 5/2002 | Johnson et al. ............... 705/19 |
| 2002/0069134 | A1 | 6/2002 | Solomon |
| 2002/0107772 | A1 | 8/2002 | Jain et al. |
| 2002/0116337 | A1 | 8/2002 | Peled et al. |
| 2002/0120475 | A1 | 8/2002 | Morimoto |
| 2002/0120530 | A1 | 8/2002 | Sutton et al. |
| 2002/0120864 | A1 | 8/2002 | Wu et al. |
| 2002/0147658 | A1 | 10/2002 | Kwan |
| 2002/0178074 | A1 | 11/2002 | Bloom |
| 2002/0194087 | A1 | 12/2002 | Spiegel et al. |
| 2003/0033205 | A1 | 2/2003 | Nowers et al. |
| 2003/0050855 | A1 | 3/2003 | Jaffe et al. |
| 2003/0065577 | A1 | 4/2003 | Haynes et al. |
| 2003/0093320 | A1* | 5/2003 | Sullivan ........................ 705/19 |
| 2003/0200156 | A1 | 10/2003 | Roseman et al. |
| 2004/0002906 | A1* | 1/2004 | Von Drehnen et al. ......... 705/31 |
| 2004/0030619 | A1* | 2/2004 | Stokes et al. .................... 705/31 |
| 2004/0073498 | A1 | 4/2004 | Breen et al. |
| 2004/0117261 | A1 | 6/2004 | Walker et al. |
| 2004/0254844 | A1 | 12/2004 | Torres |
| 2005/0027617 | A1 | 2/2005 | Zucker et al. |
| 2005/0033694 | A1* | 2/2005 | Perrin ............................. 705/44 |
| 2005/0108104 | A1 | 5/2005 | Woo |
| 2005/0114228 | A1 | 5/2005 | Wadhwani |
| 2005/0204041 | A1 | 9/2005 | Blinn et al. |
| 2005/0228750 | A1 | 10/2005 | Olliphant et al. |
| 2005/0251410 | A1 | 11/2005 | Kahn |
| 2005/0256806 | A1 | 11/2005 | Tien et al. |
| 2006/0097044 | A1 | 5/2006 | Boyd et al. |
| 2006/0122895 | A1 | 6/2006 | Abraham et al. |
| 2006/0248011 | A1 | 11/2006 | Hecht-Nielsen et al. |
| 2007/0043636 | A1* | 2/2007 | Foster ............................. 705/31 |
| 2007/0101258 | A1 | 5/2007 | Xu et al. |
| 2007/0271149 | A1 | 11/2007 | Siegel et al. |
| 2007/0299735 | A1 | 12/2007 | Mangalick et al. |
| 2008/0120129 | A1* | 5/2008 | Seubert et al. ..................... 705/1 |

FOREIGN PATENT DOCUMENTS

| | | | |
|---|---|---|---|
| JP | 2002-074068 | A | 3/2002 |
| JP | 2002-109409 | A | 4/2002 |
| JP | 2003-122946 | A | 4/2003 |
| JP | 2003-187169 | A | 7/2003 |
| JP | 2003-529815 | A | 10/2003 |
| WO | WO 01/43033 | | 6/2001 |
| WO | WO-02/29508 | A2 | 4/2002 |

OTHER PUBLICATIONS

PCT International Search Report and Written Opinion, PCT/US06/14251, Sep. 10, 2007, 7 pages.
PCT International Search Report and Written Opinion, PCT/US07/72213, Sep. 8, 2008, 11 Pages.
Non-Final Office Action, U.S. Appl. No. 11/476,468, Jul. 1, 2009, 15 Pages.
Final Office Action, U.S. Appl. No. 11/476,468, Apr. 30, 2009, 15 Pages.
Non-Final Office Action, U.S. Appl. No. 11/476,468, Jul. 29, 2008, 13 Pages.
"Auto-Completion with AJAX: Design Details," Sun Microsystems, 2005, 3 Pages, [online] [Retrieved on Jul. 18, 2006] Retrieved from the Internet<URL:https://bpcatalog.dev.java.net/nonav/ajax/autocomplete/design.html>.
"Happy Birthday Yahoo! Canada Shopping", Canada NewsWire. Ottawa: Nov. 26, 2001, p. 1, [online] [retrieved on Jul. 8, 2009] Retrieved from the internet <URL:http://proquest.umi.com/pqdweb?did=91659103&sid=5&Fmt=3&clientId=19649&RQT=309&VName=PQD>.
"DHTMLCentral.com—CoolMenus—Dynamic HTML menu script," DHTMLCentral.com, Bratta Communications, 2000-2002, 2 pages, [online] [Retrieved on Jul. 18, 2006] Retrieved from the Internet<URL:http://www.dhtmlcentral.com/projects/coolmenus/?m=31>.
"DHTML Menu, Cross Browser JavaScript Menus and Toolbar [Dynarch.com]," 1 page, [online] [Retrieved on Oct. 24, 2005] Retrieved from the InternetURL:http://www.dynarch.com/products/dhtml-menu/>.
"Dynamic HTML and XML: The XMLHttpRequest Object," Apple Computer, Inc., Developer Connection, Jun. 24, 2005, 6 pages, [online] [retrieved on Jan. 3, 2006] Retrieved from the Internet: <URL: http://developer.apple.com/internet/webcontent/xmlhttpreq.html>.
Crockford D., "JavaScript Object Notation (JSON)", Feb. 2006, 8 pages, [online] [retrieved on Jun. 26, 2006] Retrieved from the internet < URL: http://www.ietf.org/internet-drafts/draft-crockford-jsonorg-json-04.txt>.
Garrett, J.J., "Ajax: A New Approach to Web Applications," Adaptive Path, LLC, Feb. 18, 2005, 6 Pages, [online] [Retrieved on Sep. 21, 2005] Retrieved from the Internet<URL:http://www.adaptivepath.com/publications/essays/archives/000385.php>.
Garrett, J.J., "Ajax: A New Approach to Web Applications," Adaptive Path, LLC, Feb. 18, 2005, 6 Pages, [online] [Retrieved on Jul. 18, 2006] Retrieved from the Internet<URL:http://www.adaptivepath.com/publications/essays/archives/000385.php>.
Garrett, J.J., "The Elements of User Experience," Mar. 30, 2000, 1 Page, [online] Retrieved from the Internet<URL:http://www.jjg.net/ia/>.
The Gurteen Knowledge Website, 1 Page, [online] [Retrieved on Jan. 4, 2006] Retrieved from the Internet<URL:http://www.gurteen.com/gurteen/gurteen.nsf/0/7B4F85EFABF4711F80256AB9000B6f3e/>.
"HTTP Asynchronous Client Notifications," Technical Whitepaper by Clipcode.com, 9 Pages, [online] [Retrieved on Sep. 21, 2005] Retrieved on the Internet<URL:http://www.clipcode.org/messaging/http_async_notif.html>.
Jesdanun, A., "Taking Aim at Microsoft," San Jose Mercury News, Oct. 24, 2005, 3 pages.
Justus, C., "Server Side Guy: Google Suggest Dissected . . . " Dec. 14, 2004, 43 Pages, [online] [Retrieved on Jul. 18, 2006] Retrieved from the Internet<URL:http://serversideguy.blogspot.com/2004/12/google-suggest-dissected.html>.
Khare, R., "Beyond AJAX: Accelerating Web Applications with Real-Time Event Notification," Aug. 2005, pp. 1-10.
McLellan, D., "Very Dynamic Web Interfaces," XML.com, Feb. 9, 2005, 20 Pages, [online] [Retrieved or Sep. 21, 2005] Retrieved from the Internet<URL:http://www.xml.com/pub/a/2005/02/09/xml-http-request.html>.
Murray, G., Asynchronous JavaScript Technology and XML (AJAX) with Java 2 Platform, Enterprise Edition Jun. 9, 2005, 10 Pages, [online] [Retrieved on Oct. 27, 2005] Retrieved from the Internet<URL:http://java.sun.com/developer/technicalArticles/J2EE/AJAX>.
Norbye, T., "AJAX Auto-Completion Custom JSF Component: Design Details," Sun Microsystems, 2005, 7 Pages, [online] [Retrieved on Oct. 24, 2005] Retrieved from the Internet<URL:http://bpcatalog.dev.java.net/ajax/textfield-jsf/design.html>.
Russell, A., "Learning Ajax," OSCON '05 Tutorial Session, 2005, 38 Pages.
"Wick: Web Input Completion Kit," SourceForge™.net, 2 Pages, [online] [Retrieved on Jul. 18, 2006] Retrieved from the Internet<URL:http://wick.wick.sourceforge.net/>.
Notice of Grounds for Rejection mailed Dec. 6, 2011, Japanese Patent Application No. JP 2008-507761, 6 pages.
Second Office Action for Chinese Patent Application No. 200680020308.6, Dec. 27, 2010, 9 pages.
Office Action for Canadian Patent Application No. CA 2,606,236 mailed Feb. 3, 2012, 3 pages.

(56) References Cited

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broke_pro.phtml>.

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>, <http://shopatron.ooi.net/checkout1.phtml>; <http://shopatron.ooi.net|checkout3.phtml?multi=>; <http://shopatron.ooi.net|checkout4.phtml>.

"Statement in Accordance with the Notice From the European Patent Office Dated Oct. 1, 2007 Concerning Business Methods," Journal of The European Patent Office, Nov. 1, 2007, p. 592-593.

Supplementary European Search Report, European Patent Application No. EP 06750318, Jun. 23, 2010, 6 Pages.

First Office Action for Chinese Patent Application No. 200680020308.6, Apr. 8, 2010, 8 pages.

Manchanda, P., "A multi-category analysis of consumer shopping behavior," Columbia University Dissertation, DAI-A 59/11, May 1999, p. 4235.

Office Action for Canadian Patent Application No. 2,606,236, Jul. 30, 2013, 3 Pages.

Bruno, E., "AJAX: Asynchronous JavaScript and XML," Dr. Dobb's Journal, Feb. 2006.

Matlis, J., "Quick Study: AJAX," Computerworld, Jul. 11, 2005, 4 pages.

Rubenstein, D., "Adobe Flex-ible enough to stretch AJAX applications," Software Development, May 1, 2006, 2 Pages.

Office Action for U.S. Appl. No. 11/476,468, Jan. 7, 2010, 14 Pages.

Decision of Rejection for Japanese Patent Application No. JP 2008-507761, Nov. 13, 2012, 6.

* cited by examiner

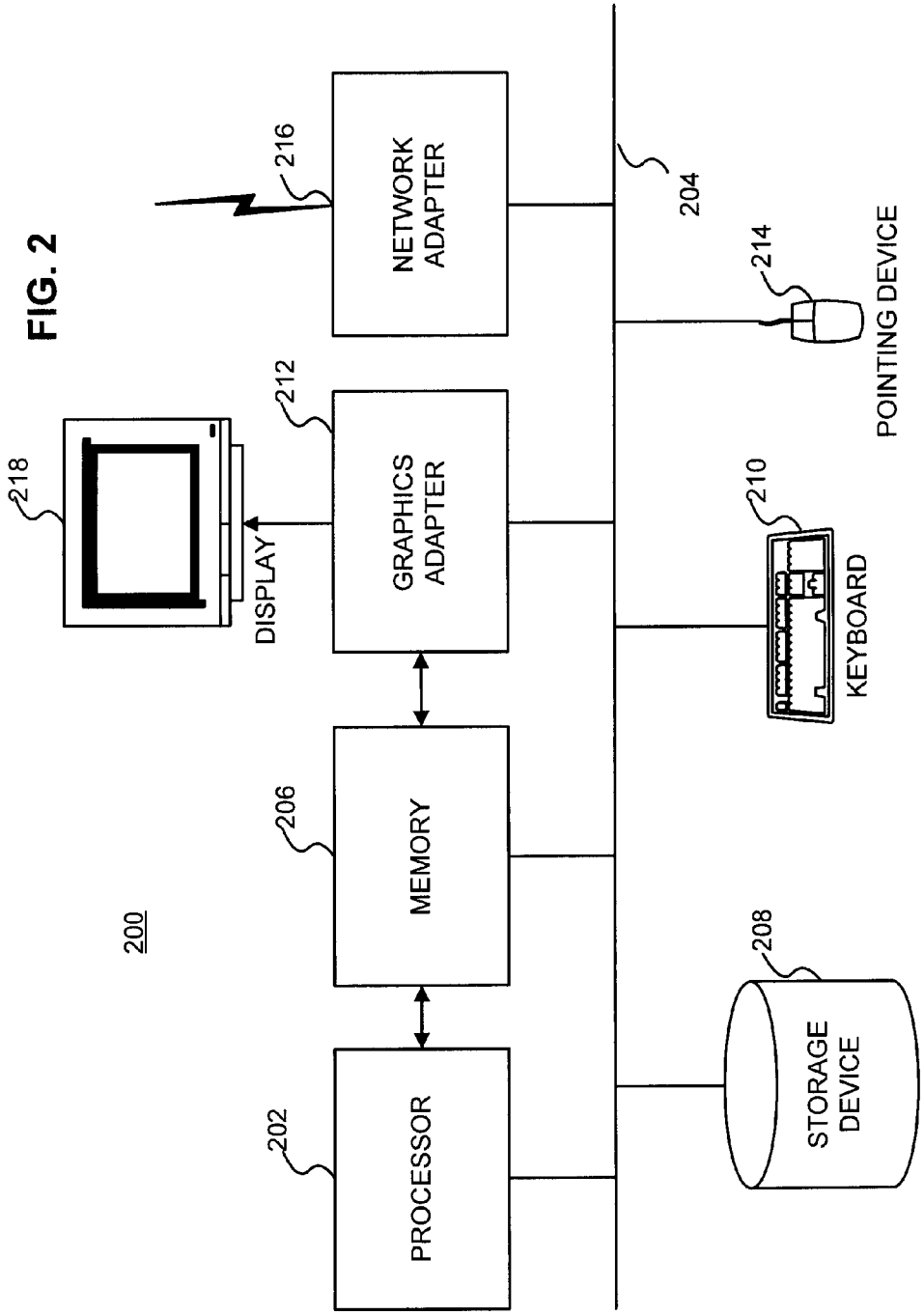

DETERMINING TAXES IN AN ELECTRONIC COMMERCE SYSTEM

CROSS-REFERENCE TO RELATED APPLICATIONS

This application is related to U.S. patent application Ser. No. 11/112,176, filed Apr. 22, 2005, entitled "Distributed Electronic Commerce System With Centralized Point Of Purchase," to U.S. patent application Ser. No. 11/299,168, filed on Dec. 29, 2005, entitled "Distributed Electronic Commerce System with Centralized Virtual Shopping Carts," to U.S. patent application Ser. No. 11/477,012, filed Jun. 27, 2006, entitled "Distributed Electronic Commerce System with Independent Third Party Virtual Shopping Carts," and to U.S. patent application Ser. No. 11/426,833, filed Jun. 27, 2006, entitled "Electronic Commerce System Utilizing Custom Merchant Calculations," each of which is hereby incorporated by reference herein in its entirety.

BACKGROUND

This invention pertains in general to electronic commerce and in particular to determining taxes to collect in jurisdictions served by an electronic commerce system.

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text, music, and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing credit card numbers, shipping addresses, or other personally-identifiable information to the merchants.

One solution to the problem described above is to provide a centralized point of purchase operated by a trusted entity. The customer provides the personally-identifiable information to only the trusted entity, and the trusted entity performs the purchase transaction on behalf of the merchant. A difficulty with using a centralized point of purchase in this manner is that both the merchant and trusted entity lack information required to complete the transaction. For example, the merchant does not know the customer's address and cannot determine the sales taxes to collect for the purchase. The trusted entity operating the centralized point of purchase, on the other hand, knows the address, but does not necessarily know how to calculate taxes on the items involved in the transaction. As a result, there is a need in the art for an electronic commerce system that allows the trusted entity operating the centralized point of purchase to calculate taxes and other transaction fees without unnecessarily exposing customer information to the merchants.

SUMMARY

The above need is met by a method, computer program product, and electronic commerce system that determine taxes to collect based in part on tax information received from the merchants. In one embodiment, the method and computer program product receive a virtual shopping cart associated with a customer and including an item and tax information for the item. The method and computer program product determine a jurisdiction of the customer based, for example, on the customer's shipping address. Further, the method and computer program product calculate taxes applicable to the item based at least in part on the determined jurisdiction and the tax information in the virtual shopping cart.

In one embodiment, the electronic commerce system for conducting the electronic commerce transaction includes a communications module for receiving a virtual shopping cart including an item and tax information for the item. The system also includes a tax determination module for determining the jurisdiction of the customer and for determining taxes to collect for the item based at least in part on the tax information in the shopping cart and the jurisdiction of the customer. In addition, the system includes a transaction module for conducting the commerce transaction with the customer and collecting the taxes.

BRIEF DESCRIPTION OF THE DRAWINGS

FIG. 2 is a high-level block diagram illustrating a functional view of a typical computer system for use as one of the entities illustrated in the environment of FIG. 1 according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

A. Overview

Figure 1:
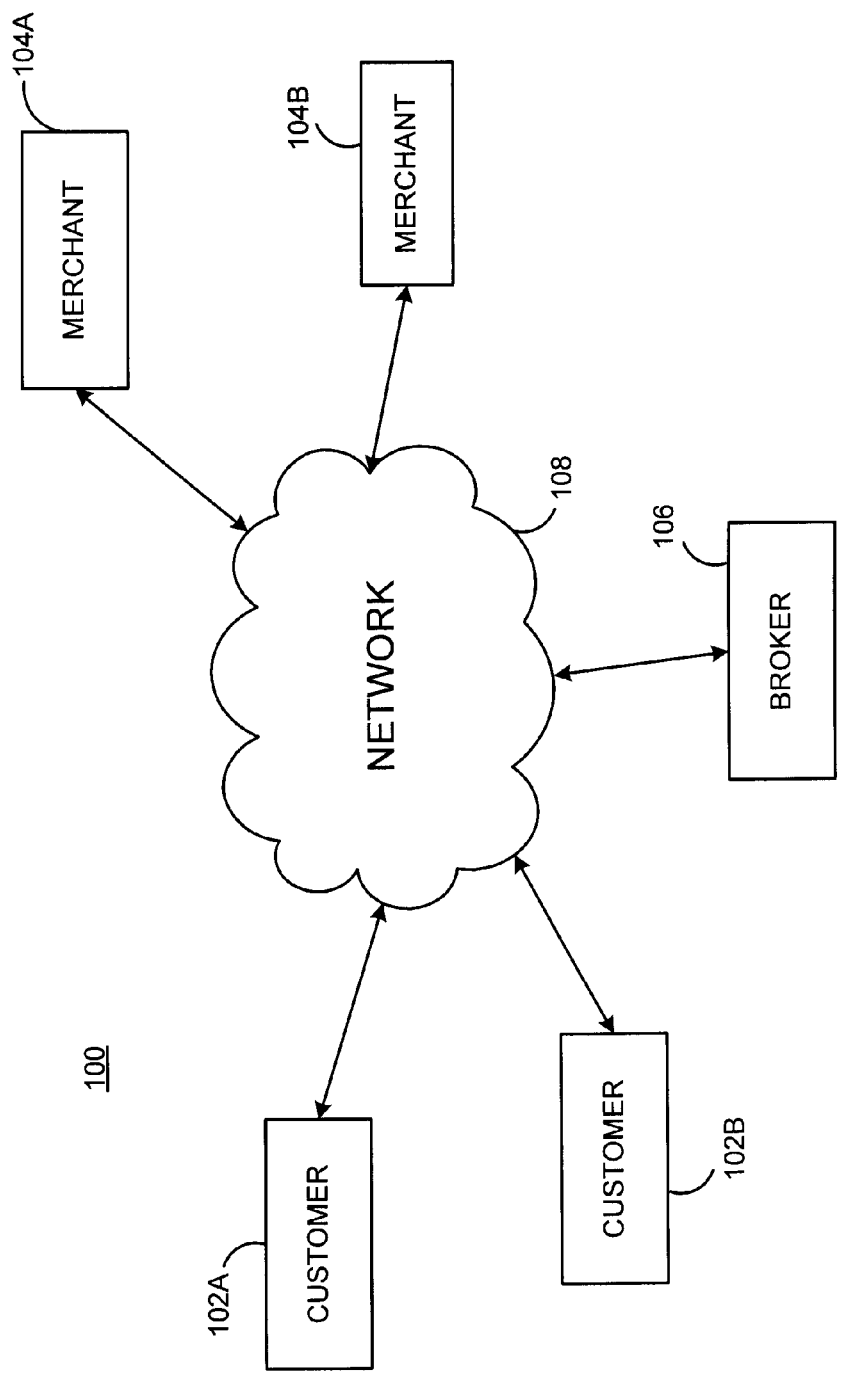
FIG. 1 is a high-level block diagram of a computing environment according to one embodiment.

FIG. 1 is a high-level block diagram of a computing environment 100 according to one embodiment of the present invention. FIG. 1 illustrates two customers 102A and 102B, two merchants 104A and 104B, and a broker 106 connected by a network 108. FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A" and/or "104B" in the figures).

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "purchase." End-users acting as customers 102 can include end-users purchasing items for their own use or as gifts, and/or end-users purchasing items for the use of a company or other enterprise with which the end-users are associated.

In one embodiment, the customer 102 includes a computer system utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a television "set-top box" etc. Although FIG. 1 illustrates two customers 102, embodiments of the present invention can have thousands or millions of customers participating in the electronic commerce system described herein. Only two customers 102 are illustrated in order to simplify and clarify the present description.

Similarly, the merchant 104 represents an entity that sells items on the network 108 or makes items available through other types of transactions. The merchant 104 offering an item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale." Although FIG. 1 illustrates only two merchants 104, embodiments of the present invention can have many merchants participating in the electronic commerce system. Only two merchants 104 are illustrated in order to simplify and clarify the present description.

In one embodiment, the merchant 104 includes a computer system acting as a web server that is utilized to offer the items to potential customers 102. The merchant 104 is said to be "online," meaning that the merchant provides a presence on the network 108. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc.

The merchant 104 allows customers 102 to shop using a "shopping cart" metaphor. A customer 102 places an item in a virtual shopping cart. When the customer desires to purchase the items in the shopping cart, the customer chooses a "purchase" option or equivalent on the merchant's web site. In one embodiment, the customer 102 does not provide any personally-identifiable information, such as a name, address, or credit card number, to the merchant 104.

The merchant 104 encodes tax information in the virtual shopping cart. The tax information specifies tax rates to apply to items in the cart in various jurisdictions (e.g., states and/or ZIP code ranges). In one embodiment, the tax information optionally includes a default tax table describing tax rates applicable to items in all of the jurisdictions. In addition, the tax information optionally includes one or more exception tax tables describing tax rates applicable to certain items in only certain jurisdictions. In addition, the tax information indicates whether to use the default or exception tax tables for the items in the cart. The tax information also describes additional pertinent information, such as whether to collect taxes on shipping costs.

The broker 106 represents an entity that serves as an intermediary for the transaction between the customer 102 and the merchant 104. In one embodiment, the broker 106 operates a system that functions as a centralized place that the customers 102 can use to pay for items offered by the merchants 104. Thus, the customers 102 can patronize multiple merchants 104 while providing their payment information to only the broker 106. Although FIG. 1 illustrates only a single broker 106, embodiments of the present invention can have multiple brokers participating in the electronic commerce system.

In one embodiment, the broker 106 is within a different "domain" than the customer 102 and/or merchant 104. As used here, the term "domain" generally refers to a sphere of influence. A broker 106 and merchant 104 are in different domains when they are independent of each other and lack a shared point of control. There is not necessarily a relationship between the domain in which a broker 106 and/or merchant 104 reside and the domain names utilized by those entities on the network 108, although the use of different domain names may constitute evidence that the broker and merchant are independent and thus in different domains. In some embodiments, the broker 106 is within the same domain as some customers 102 and/or merchants 104, and in a different domain than other customers and/or merchants.

In one embodiment, the broker 106 receives a customer's shopping cart from the merchant 104 and/or the customer 102. The broker 106 conducts a transaction with the customer 102 to enable the customer to purchase the items in the shopping cart. During the transaction, the broker 106 learns information about the customer 102, such as the customer's shipping and billing addresses. The broker 106 uses this customer information, in combination with the tax information received in the shopping cart, to determine the taxes to collect for the transaction.

The network 108 represents the communication pathways between the customers 102, merchants 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system. The merchant and broker computer systems, in contrast, may comprise more powerful computers and/or multiple computers working together to provide the functionality described herein.

Figure 3:
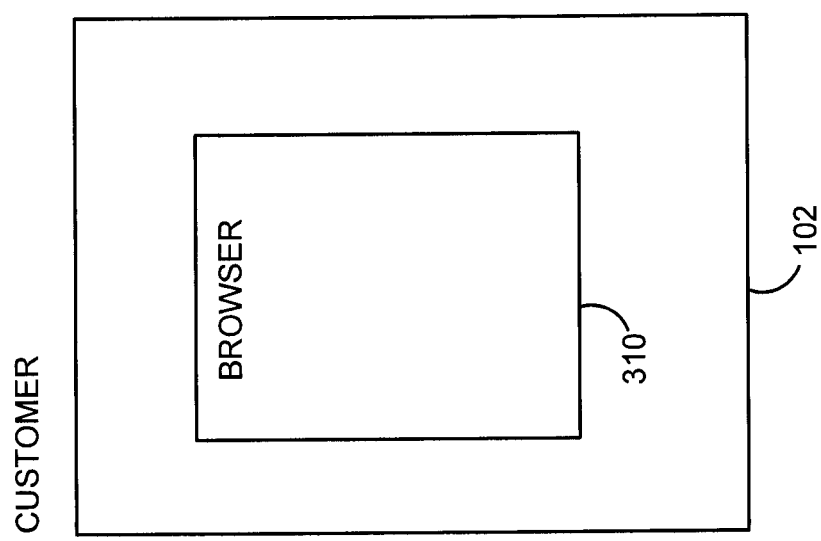
FIG. 3 is a high-level block diagram illustrating modules within a customer according to one embodiment.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages provided by the merchant 104, broker 106, and/or other entities on the network 108. In one embodiment, the browser module 310 is a conventional web browser, such as MICROSOFT INTERNET EXPLORER or MOZILLA FIREFOX.

Figure 4:
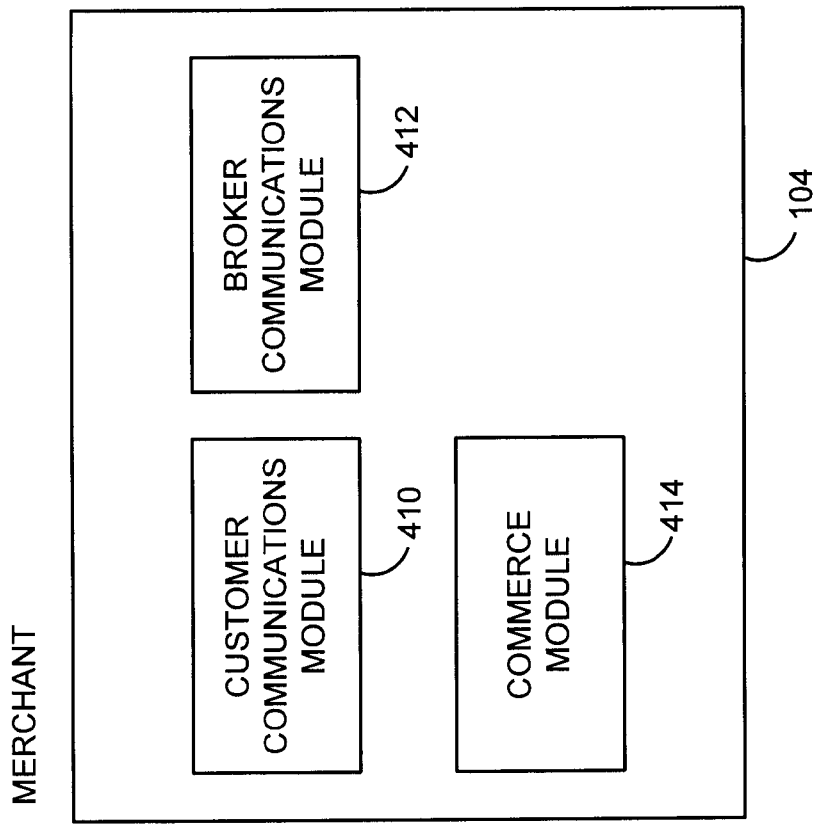
FIG. 4 is a high-level block diagram illustrating modules within the merchant according to one embodiment.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 410 communicates with the customer 102 via the network 108. In one embodiment, the customer communications module 410 includes a web server that provides web pages to the customer 102 and receives end-user input sent over the network 108 by the customer's browser module 310. The customer communications module 410 thus allows a customer to navigate the merchant's web site.

In one embodiment, a broker communications module 412 communicates with the broker 106 via the network 108. In one embodiment, merchant-broker communications are conducted using the web services description language (WSDL). The broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via email messages, HTML web pages intended for review by human users, proprietary communications protocols, etc.

A commerce module 414 operates in tandem with the customer communications module 410 and allows the customer 102 to engage in electronic commerce with the merchant 104. In general, the commerce module 414 allows the merchant 104 to create and manage a catalog of items available for sale. The customer 102 can browse the catalog and indicate items that the customer 102 desires to purchase. In one embodiment, the commerce module 414 includes functionality from the open source osCommerce package. The commerce module 414 utilizes a shopping cart metaphor where items selected by the customer 102 are placed in a virtual shopping cart. The merchant 104 provides this shopping cart to the broker 106.

When this description refers to "placing" or "storing" an item in a cart, it should be understood that a virtual representation of the item is actually stored, and not the item itself. In one embodiment, this virtual representation includes information describing the item, including the name, price, and quantity of the item, a textual description of the item, a merchant identification (ID) that uniquely identifies the merchant 104, and/or private merchant data that might be opaque to entities other than the merchant 104. Further, in one embodiment the commerce module 114 places information in the shopping cart describing possible shipping methods and costs, anticipated shipping dates, and/or order processing times for given items. In one embodiment, the commerce module 414 digitally signs the shopping cart to prevent third parties from modifying it.

In one embodiment, the commerce module 414 includes tax information in the shopping cart. The tax information includes one or more tax tables describing the tax rates assessed on items in multiple jurisdictions, and encoding logic that can be utilized by the broker 106 to determine the appropriate taxes to collect during a transaction with a customer 102. In one embodiment, the tax tables include a default tax table and an exception tax table. The default tax table specifies tax rates for all jurisdictions, while the exception tax table specifies special tax rates for certain items in only certain jurisdictions. In one embodiment, the default tax table also specifies whether given jurisdictions collect taxes on shipping costs.

The jurisdictions represented in the tax tables include, for example, countries, states, counties, cities, and/or other autonomous regions that collect sales taxes, use taxes, and/or other types of taxes. In one embodiment, the tax tables identify jurisdictions through specific ZIP codes, ZIP code ranges (e.g., 10001-10025), ZIP code patterns (e.g., "1001*"), other postal codes, by state, and/or via other techniques. The tax tables specify tax rates as a percentage of a sales price, as a flat rate, and/or using another technique. The merchant 104 provides this information because the merchant is often in the best position to determine how the various jurisdictions tax the items it sells.

In some embodiments, the tax information in the shopping cart includes multiple exception tax tables applicable to different items in the shopping cart. The tax information in the shopping cart further indicates whether to apply the default or an exception tax table to each item in the cart. This indication is accomplished, for example, by setting a flag indicating that an exception tax table applies to an item.

To understand tax tables, consider an example of a shopping cart that contains a pair of shoes and a grocery item. In the United States, California and many other states charge sales taxes on shoes and other clothing, but only Alabama and a few other states charge sales tax on groceries. In this example, the commerce module 414 inserts tax information into the shopping cart that specifies default and exception tables containing the following information:

| DEFAULT | | |
| --- | --- | --- |
| JURISDICTION | RATE | SHIPPING |
| CA | 8.5% | 0% |
| AL | 4% | 0% |

| EXCEPTION | |
| --- | --- |
| JURISDICTION | RATE |
| CA | 0% |

In addition, the tax information indicates to apply the default tax table to the shoes, and to apply the exception table to the grocery item. As described below, the broker 106 or another entity that interprets the table will apply the default rate if the exception table lacks an entry for a jurisdiction. Thus, these tables and the related tax information indicate that Alabama taxes shoes and groceries at 4%, California taxes most things at 8.5% and groceries at 0% (i.e., does not tax groceries), and neither state taxes shipping. In other embodiments, the tax tables can encode information such as special taxes to collect on certain items, like disposal fees for televisions and refund values for bottled drinks.

Although this description uses the term "tax tables" to describe the tax information, those of skill in the art will recognize that the tax information can be represented in formats and data structures other than tables. As such, this description uses the term "tables" merely for convenience even though the tax information may be encoded in different representations.

In one embodiment, the commerce module 414 encodes the shopping cart using XML. The broker 106 or another entity provides an XML schema definition (XSD) to the merchant 104 that describes how to encode the item information, tax information, and other information in the shopping cart. The merchant 104 creates the shopping cart according to the XSD.

The following is an example of a shopping cart according to one embodiment:

```
<?xml version="1.0" encoding="UTF-8"?>
<checkout-shopping-cart xmlns="http://checkout.google.com/schema/
2-beta1">
  <shopping-cart>
    <items>
      <item>
        <item-name>Google Shoes</item-name>
        <item-description>Size 7 shoes made by Google! </
        item-description>
        <unit-price currency="USD">40</unit-price>
        <quantity>1</quantity>
      </item>
      <item>
        <item-name>Google Maple Syrup</item-name>
        <item-description>
          From the finest trees in Mountain View!
        </item-description>
        <unit-price currency="USD">10</unit-price>
        <quantity>5</quantity>
        <tax-table-selector>groceries</tax-table-selector>
      </item>
    </items>
  </shopping-cart>
  <checkout-flow-support>
    <merchant-checkout-flow-support>
      <tax-tables>
        <default-tax-table>
          <tax-rules>
            <default-tax-rule>
              <shipping-taxed>false</shipping-taxed>
              <tax-area>
                <us-state-area><state>CA</state></us-state-area>
              </tax-area>
              <rate>0.085</rate>
            </default-tax-rule>
            <default-tax-rule>
              <shipping-taxed>false</shipping-taxed>
              <tax-area>
                <us-state-area><state>AL</state></us-state-area>
              </tax-area>
              <rate>0.04</rate>
            </default-tax-rule>
          </tax-rules>
        </default-tax-table>
        <alternate-tax-tables>
          <alternate-tax-table name="groceries" standalone="true">
            <alternate-tax-rule>
              <tax-area>
                <us-state-area><state>CA</state></us-state-area>
              </tax-area>
              <rate>0</rate>
            </alternate-tax-rule>
          </alternate-tax-rules>
          </alternate-tax-table>
        </alternate-tax-tables>
      </tax-tables>
    </merchant-checkout-flow-support>
  </checkout-flow-support>
</checkout-shopping-cart>
```

This cart contains two items: a pair of shoes and maple syrup (quantity of five). The cart also contains tax rules for California and Alabama. The default tax rules in the cart indicate that neither California nor Alabama taxes shipping, California charges 8.5% sales tax, and Alabama charges 4% sales tax. The exception tax rules in the cart indicate that California charges 0% tax on groceries. While the sample cart described above identifies the jurisdictions, CA and AL, by their two-letter abbreviations, the cart could also have used ZIP codes, ZIP code ranges, and/or ZIP code patterns to specify the jurisdictions.

In one embodiment, the commerce module 414 provides the customer 102 with one or more payment options at the time of checkout. One option references a payment system provided by the broker 106. The broker's payment system may be more desirable to a customer 102 when, for example, the merchant 104 is not well known to the customer. The broker 106 may be well known to the customer 102 and an entity to which the customer 102 is comfortable providing payment information. In one embodiment, the commerce module 414 provides a graphic, slogan, and/or other indicia that represents the broker 106 and is designed to convey a sense of trustworthiness to the customer 102.

When the customer selects the broker payment system, or at another time, the commerce module 414 uses the customer communications module 410 to provide the shopping cart to the customer 102 and direct the customer's browser module 310 to send it to the broker 106. The commerce module 414 can perform this latter task, for example, by using a HTTP GET method that codes the shopping cart into a uniform resource locator (URL) that references the broker 106, and redirecting the customer's browser 310 to the coded URL. In another example, the commerce module 414 uses a HTTP POST method that codes the shopping cart into the body of a request made from the customer's browser 110 to the broker 106. In another embodiment, the commerce module 414 uses the broker communications module 412 to send the shopping cart directly to the broker 106.

Although this description refers to the collection of information created by the commerce module 414 as a "shopping cart," it will be understood that this phrase refers to a collection of information utilized to inform the broker 106 about the items selected by the customer 102. In one embodiment, for example, the commerce module 414 creates one or more sets of data describing items that the customer 102 desires to purchase, and provides the sets of data to the broker 106. The broker 106, in turn, stores the sets of data in one or more shopping carts it maintains on behalf of the customer 102. Thus, the merchant 104 provides the broker 106 with item descriptions rather than virtual shopping carts.

Figure 5:
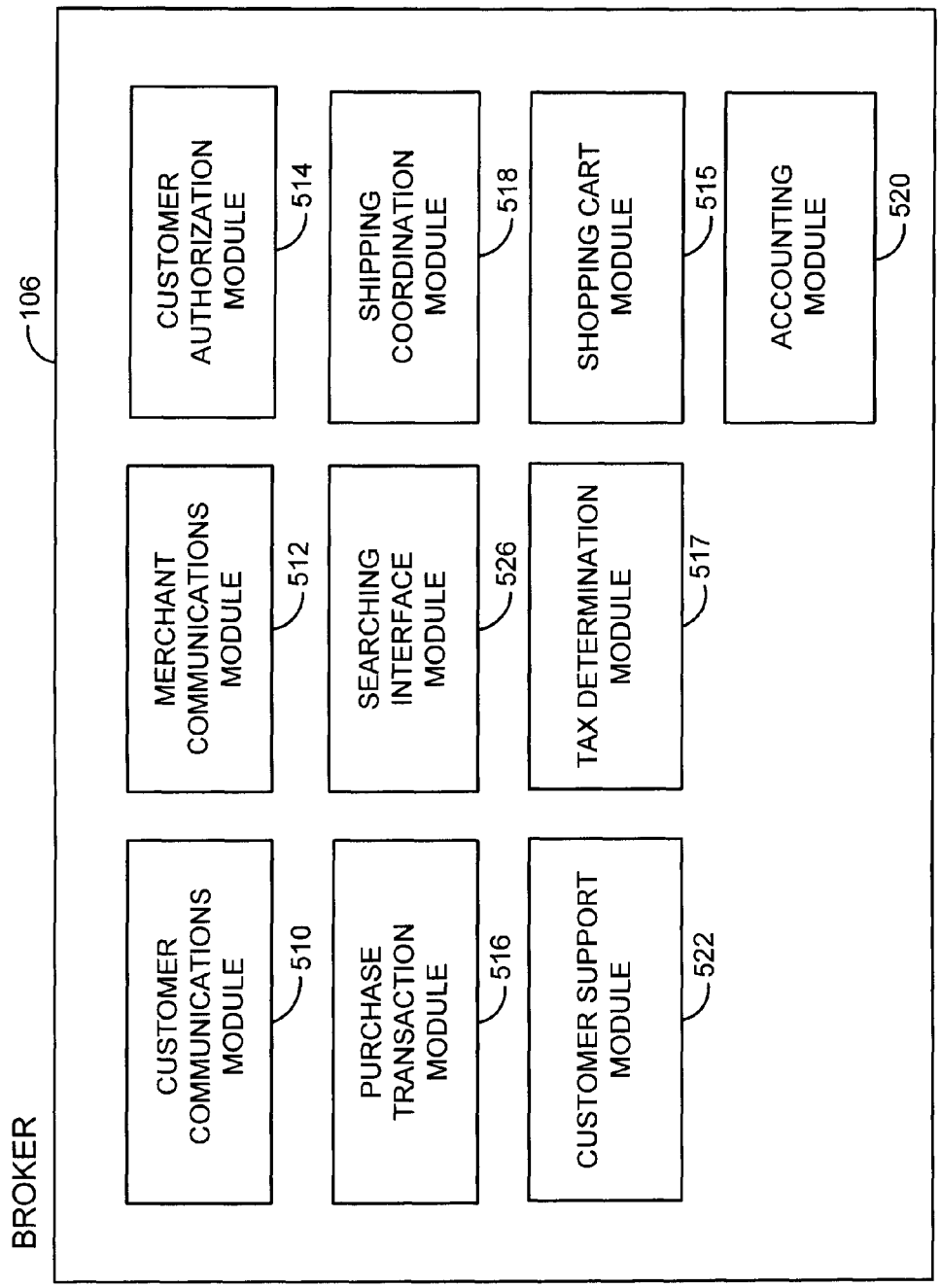
FIG. 5 is a high-level block diagram illustrating modules within the broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker 106 includes a customer communications module 510 and a merchant communications module 512 for respectively communicating with the customer 102 and the merchant 104. In one embodiment, these modules are functionally equivalent to the customer 410 and broker 412 communications modules in the merchant 104.

A customer authorization module 514 authenticates and authorizes customers 102 seeking to use the broker 106 for purchases. In one embodiment, the customer authorization module 514 maintains an ID, password, and/or other information for each customer 102. The customer 102 supplies the correct information in order to identify and authenticate itself. In general, when a customer 102 interacts with the broker 106 to make a purchase, the customer's relationship with the broker fits into one of three categories: new customer, existing customer that has not been active recently, or existing active customer. In one embodiment, the customer authorization module 514 determines the category of the customer 102 and responds accordingly.

If the customer 102 is new, an embodiment of the customer authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences.

If the customer 102 already has an account but has not been active recently (e.g., within the previous 10 minutes), in one embodiment the customer authorization module 514 provides the customer with the standard login prompt and thereby allows the customer to log into the broker 106. If the customer 102 has been active recently, one embodiment of the customer authorization module 514 allows the customer to directly access the broker 106 without additional authentication procedures. After each successful login, one embodiment of the customer authorization module 514 places a cookie in the customer's browser module 310 that identifies the customer and indicates the time of the customer's last login. In another embodiment, the cookie identifies the expiration date/time after which the customer's activity is no longer considered "recent." The cookie thus allows the customer authorization module 514 to determine the customer's status with respect to the broker 106 and respond appropriately.

In one embodiment, the customer authorization module 514 allows a customer to conduct limited interactions with the broker 106 without establishing an account or providing identifying and/or authenticating information. For example, in one embodiment the merchant 104 provides the customer's web browser 310 with a cookie that identifies a shopping cart storing an item selected by the customer 102. When the customer 102 interacts with the broker 106, the customer's browser 310 provides the cookie to the broker 106, and the customer authorization module 514 allows the customer to view the shopping cart even though the customer has not been identified and/or authenticated.

The shopping cart module 515 maintains a set of shopping carts for the customers 102. The shopping cart module 515 receives the shopping carts from the merchant 104, from the customer 102, and/or from other sources. In one embodiment, the shopping cart module 515 maintains a single shopping cart for each customer 102. In other embodiments, the shopping cart module 515 maintains multiple shopping carts per customer 102. Depending upon the embodiment, the shopping carts store items from a single merchant or from multiple merchants. In one embodiment, the shopping cart module 515 deletes shopping carts that have not been accessed within a certain time period (e.g., 90 days).

A purchase transaction module 516 allows a customer 102 to purchase the items in a selected shopping cart. In one embodiment, the purchase transaction module 516 presents the customer 102 with web pages that describe the items in the cart and allow the customer to specify the methods of payment and shipping, along with any other details that are necessary and/or desired for the transaction. The purchase transaction module 516 uses the shipping address specified by the customer 102 and the shipping rules received from the merchant to calculate the rates for the customer's selected shipping method. In one embodiment, the purchase transaction module 516 stores the shipping costs as an "invisible" item in the shopping cart.

Figure 6:
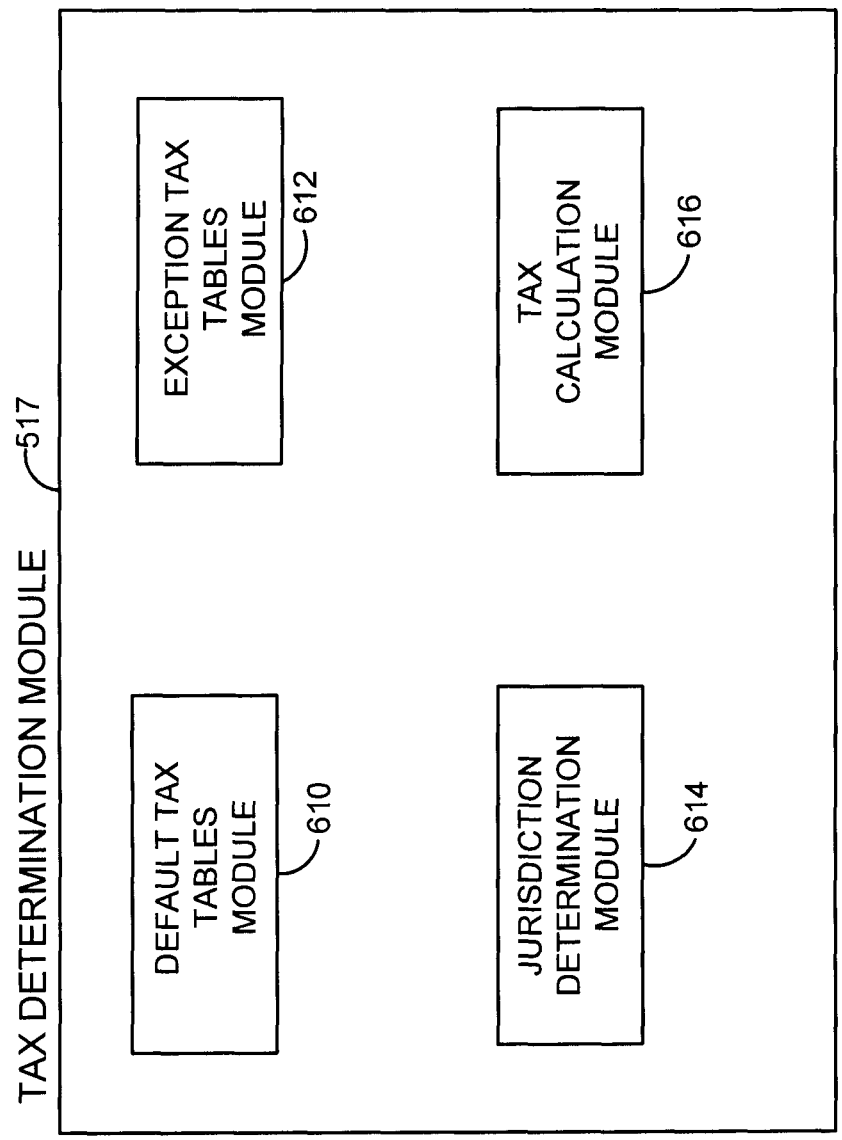
FIG. 6 is a high-level block diagram illustrating modules within the tax determination module of the broker according to one embodiment.

In addition, the purchase transaction module 516 interacts with a tax determination module 517 that determines the amount of taxes to collect for the transaction. FIG. 6 is a high-level block diagram illustrating modules within the tax determination module 517 according to one embodiment. Those of skill in the art will recognize that other embodiments can have different and/or other modules than the ones described here, and that the functionalities can be distributed among the modules in a different manner.

A default tax tables module 610 holds the one or more default tax tables for the transaction. In one embodiment, the default tax tables module 610 obtains the default tables from the shopping cart received by the broker 106. Once the purchase transaction completes, an embodiment of the default tax tables module 610 deletes the tables. In another embodiment, the default tax tables module 610 maintains the tax table after the transaction completes. Similarly, an exception tax tables module 612 holds one or more exception tax tables for the transaction.

In one embodiment, some or all of the tax tables in the default 610 and/or exception 612 tax tables modules are provided by the merchant 104, broker 106 or another source via a communications pathway other than a shopping cart. In one embodiment the tax determination module 517 and/or another module in the broker 106 provides a network interface with which merchants 104 send tax tables and/or other data directly to the broker 106. The tax table modules 610, 612 persistently store the tax tables for later use. In another embodiment, the broker 106 establishes the default and/or exception tax tables itself.

In embodiments where the tax tables are persistently stored in the default 610 and/or exception 612 tax table modules, the merchants 104 need not include tax tables in the shopping carts. Rather, the merchants 104 include tax information in the shopping carts indicating which stored table to use for an item and/or transaction. For example, the tax information can indicate that an exception table is used for a certain item in the cart, while the default table is used for other items in the cart. Similarly, in one embodiment the merchants 104 include exception tax tables in the shopping carts for certain items in the cart, and includes tax information referencing default tax tables persistently stored in the default tax tables module 610 for other items.

A jurisdiction determination module 614 determines the jurisdiction applicable to a purchase transaction. For most transactions, the jurisdiction is determined by the shipping address supplied by the customer 102. In other embodiments, the jurisdiction determination module 614 uses other criteria, such as the billing address, merchant location, etc. in addition to, or instead of, the shipping address.

A tax calculation module 616 calculates the taxes to collect for a given transaction based on the default tax tables, exception tax tables, jurisdiction, purchase price, additional data in the shopping cart, and/or other factors. In one embodiment, the tax calculation module 616 calculates the taxes to collect for an item by determining the cost of the item and analyzing the shopping cart data to identify the tax table to use for the item. The shopping cart data identify either the default tax table or an exception tax table.

If the data identify the default tax table, the tax calculation module 616 determines that table's entry for the given jurisdiction, and looks up the tax rate specified by the table for the jurisdiction. If the data identify an exception tax table, the tax calculation module 616 determines whether the exception table specifies a rate for the given jurisdiction and, if so, uses that rate. If the exception tax table does not specify a rate for the jurisdiction, an embodiment of the tax calculation module 616 uses the default tax table rate instead. In one embodiment, the orders of the entries within the tax tables matter. If there are two or more entries in the default or an exception tax table that match a jurisdiction, the tax calculation module 616 uses the tax rate of the first matching entry. In one embodiment, the tax calculation module 616 also determines whether the ship-to jurisdiction taxes shipping. If so, the tax calculation module 616 calculates the shipping tax for the "shipping cost" item in the cart.

For example, assume the shopping cart contains a pair of shoes and a grocery item, each costing $1.00, and specifies the default table for the shoes and the exception table for the grocery item. Also assume that the default 610 and exception 612 tax table modules respectively hold the default and exception tax tables described above:

| DEFAULT | | |
|---|---|---|
| JURISDICTION | RATE | SHIPPING |
| CA | 8.5% | 0% |
| AL | 4% | 0% |

| EXCEPTION | |
|---|---|
| JURISDICTION | RATE |
| CA | 0% |

If the customer 102 provides a shipping address in Alabama, the tax calculation module 616 uses the default tax table entry for AL to calculate the amount of tax to collect for the shoes, $0.04. For the grocery item, the tax calculation module 616 determines whether the exception table contains an entry for AL. Since the table does not have such an entry, the tax calculation module 616 uses the default table entry for AL instead and therefore calculates that the broker should collect $0.04 for the grocery item. If the jurisdiction were California instead of Alabama, the tax calculation module 616 would calculate a $0.085 tax for the shoes, and a $0.00 tax (no tax) for the grocery item. In addition, the tax calculation module 616 determines that no tax is collected on shipping costs.

Returning to FIG. 5, the purchase transaction module 516 uses item prices specified in the shopping cart, the shipping options selected by the customer 102, and the taxes determined by the tax determination module 517 to determine the total cost of the transaction. The purchase transaction module 516 charges the customer 102 for the total amount, and provides the customer with a receipt.

A shipping coordination module 518 interacts with the merchant 104 to inform the merchant of the purchase and coordinate shipping of the purchased items to the customer 102. In one embodiment, the shipping coordination module 518 provides the customer-indicated shipping address and shipping options to the merchant 102. Thus, the merchant 104 becomes aware of the customer's identity only after the purchase transaction completes.

An accounting module 520 monitors the transactions that occur using the broker 106, invoices the customers 102, and credits the merchants 104. In a typical case, the accounting module 520 charges the customer's credit card or other method of payment and credits the merchant's account for the amount of the purchase. In another embodiment, the accounting module 520 aggregates purchases made by the customers and then periodically credits each merchant for the value of the purchases made within the time period. In yet another embodiment, the accounting module 520 aggregates a customer's purchases within a given time period and then charges the customer's account once for the aggregate total of the purchases. This latter embodiment might be desirable where, for example, the customer 102 makes many small purchases.

A customer support module 522 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, a searching interface module 526 provides the customers 102 with access to content searching capabilities. These capabilities allow a customer 102 to provide the searching interface module 526 with a search query that specifies search parameters such as keywords, meta-data describing desired results, and/or other information and receive in return a list of content that at least partially satisfies the query. In one embodiment, the search query is generated implicitly based on actions performed by the customer 102 and/or other criteria. In one embodiment, the searching interface module 526 interfaces with a search engine provided by GOOGLE INC. of Mountain View, Calif. The search engine searches for content, shopping carts, and/or items provided by the merchants 104 that satisfy the queries. In one embodiment, the search engine also searches other domains.

III. Process/Example

Figure 7:
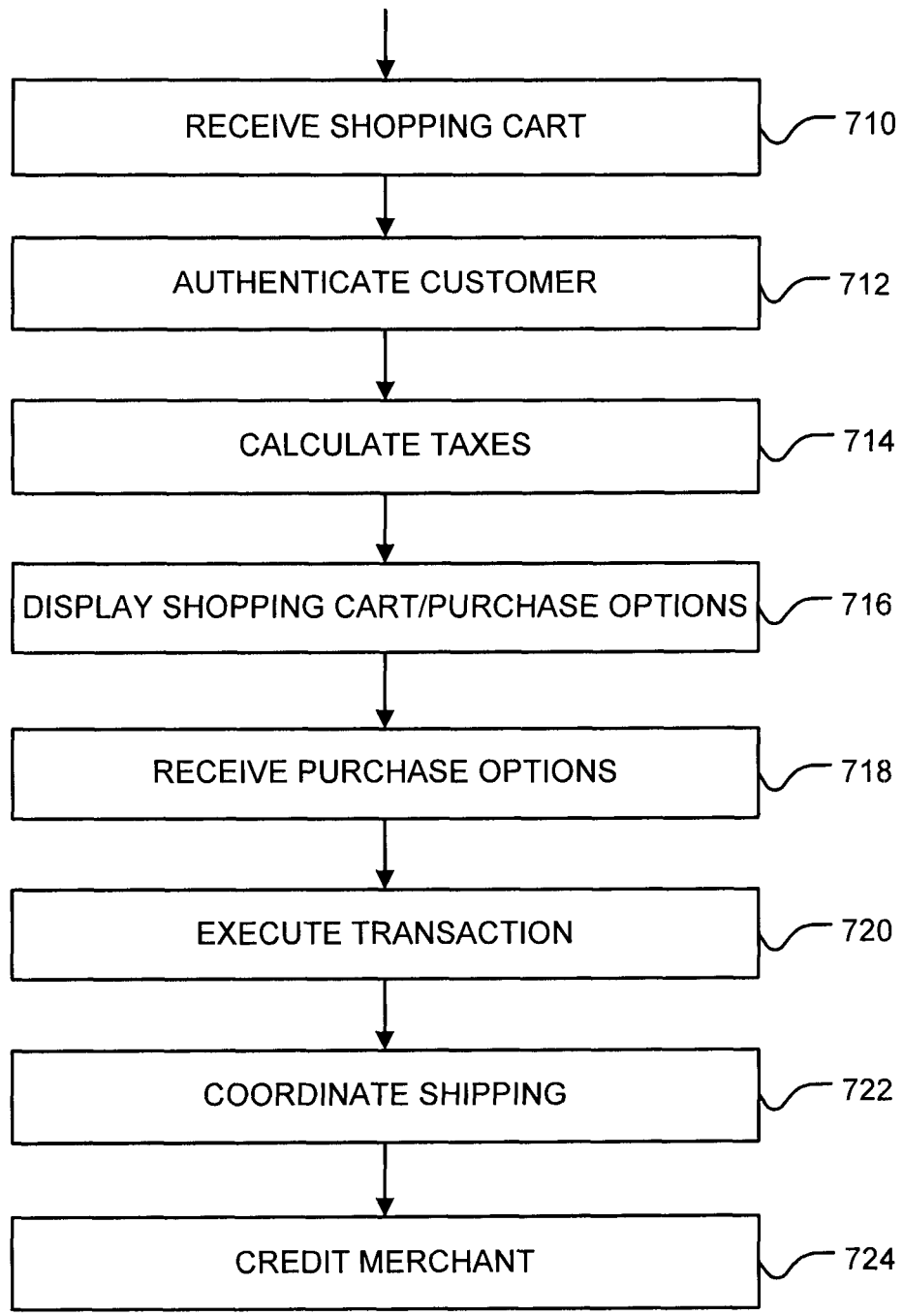
FIG. 7 is a flow chart illustrating the operation of the broker according to one embodiment.

FIG. 7 is a flow chart illustrating the operation of the broker 106 according to one embodiment of an exemplary transaction where a customer 102 interacts with a merchant 104 to establish a shopping cart containing one or more items, and then the customer interacts with the broker 106 to purchase the items in the cart. The steps relating to the customer's interactions with the merchant 104 are not shown in the figure. Those of skill in the art will recognize that other embodiments can perform the steps of FIG. 7 in different orders. Moreover, other embodiments can include different and/or additional steps than the ones described here.

Initially, the broker 106 receives 710 the virtual shopping cart from the merchant 104 and/or customer 102. The shopping cart identifies items that the customer desires to purchase. In addition, the cart contains data about the items, such as the prices and quantities, and possible shipping methods and costs. In one embodiment, the cart also includes tax information defining default and/or exception tax tables and indicating which tax tables to use for calculating the taxes to collect for the items. The tax information describes the tax rates assessed on the items in multiple jurisdictions, and encodes logic that can be utilized by the broker 106 to determine the appropriate taxes to collect during a transaction with the customer 102.

The customer 102 interacts with the broker 106 and indicates a desire to purchase the items in the cart. In order to effect the purchase, the broker 106 authenticates 712 the customer 102. Authentication can occur, for example, by asking the customer for an ID, password and/or other identifying information. The broker 106 identifies information about the customer 102 including one or more shipping and/or billing addresses stored in the customer's account.

The broker 106 uses the addresses stored in the customer's account to calculate 714 taxes for the addresses potentially involved in the transaction. In one embodiment, the broker 106 uses the shipping address stored in the customer's account to establish a jurisdiction for the purchase. For example, the jurisdiction is the postal code associated with the address. The broker 106 determines from the tax information in the cart whether to use the default or exception tax tables to determine the tax rates for the items in the cart. The broker 106 then determines the tax rate for the jurisdiction specified in the appropriate table. If the exception table lacks an entry for the jurisdiction, an embodiment of the broker 106 uses the default tax table entry instead. In addition, the broker 106 uses the default tax table to determine whether and what taxes to collect on the shipping costs.

The broker 106 displays 716 a representation of the shopping cart to the customer 102. The broker 106 also displays 716 web page buttons or another interface that allow the customer 102 to select purchase options. Purchase options include, for example, a shipping address, shipping method, and means of payment. The customer 102 selects the desired options, and the broker receives 718 the selections from the customer's browser 310. The broker 106 updates the displayed representation of the shopping cart to include the previously-calculated taxes and shipping costs based on the purchase options selected by the customer 102.

The broker 106 calculates the total cost of the transaction based on the items, quantities, shipping costs, taxes, and/or other criteria and executes 720 the transaction by charging the customer's credit card, subtracting a value from a stored value account, and/or performing an equivalent action. The broker 106 coordinates 722 shipping with the merchant 104. In one embodiment, the broker 106 supplies the customer-selected shipping address and method to the merchant 104 and instructs the merchant to ship the purchased items directly to the customer 102. The broker 106 credits 724 the merchant 104 for the transaction. In one embodiment, the broker 106 keeps percentage of the transaction and/or charges the merchant 104 a fee for conducting the transaction.

Using tax tables in this manner allows the broker 106 to determine the appropriate taxes to collect for transactions conducted on behalf of merchants 104, without exposing any personally-identifiable customer information to the merchant until after the transaction completes. Thus, customers are more likely to purchase items from smaller or relatively unknown merchants which the customers might otherwise be reluctant to patronize.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining taxes in an electronic commerce system, comprising:
   receiving, by a broker computer system separate from a merchant, a virtual shopping cart associated with a customer, the shopping cart including a plurality of items identified by the customer for purchase from the merchant and tax information comprising a default tax table, an exception tax table, and indication information indicating for each of the plurality of items whether to use the default tax table or the exception tax table to calculate taxes applicable to the item, the default tax table describing default numerical tax rates applied to commerce transactions and the exception tax table describing special numerical tax rates applicable to certain items each default numerical tax rate and special numerical tax rate associated with at least one jurisdiction;
   determining, by the broker computer system, a jurisdiction of the customer;
   calculating, by the broker computer system, taxes applicable to the plurality of items responsive to the determined jurisdiction and the tax information; and executing, by the broker computer system, a commerce transaction for the plurality of items using the calculated taxes.

2. The method of claim 1, wherein executing the commerce transaction comprises collecting the calculated taxes.

3. The method of claim 1, wherein determining the jurisdiction of the customer comprises:
    determining a shipping address for the customer.

4. The method of claim 1, wherein the tax information in the virtual shopping cart comprises information describing whether a plurality of different jurisdictions collect taxes on shipping charges.

5. The method of claim 1, wherein the indication information indicates to use the exception table to calculate taxes applicable to an item from the plurality of items, and calculating taxes comprises:
    calculating the taxes applicable to the item using the default tax table if the exception tax table lacks a numerical tax rate for the determined jurisdiction of the customer.

6. The method of claim 1, wherein the virtual shopping cart is received from the merchant.

7. The method of claim 1, wherein the virtual shopping cart is received from the customer.

8. A computer program product having a non-transitory computer-readable storage medium having computer program instructions tangibly embodied thereon for determining taxes in an electronic commerce system, the computer program instructions comprising instructions for:
    receiving, by a broker separate from a merchant, a virtual shopping cart associated with a customer, the shopping cart including a plurality of items identified by the customer for purchase from the merchant and tax information comprising a default tax table, an exception tax table, and indication information indicating for each of the plurality of items whether to use the default tax table or the exception tax table to calculate taxes applicable to the item, the default tax table describing default numerical tax rates applied to commerce transactions and the exception tax table describing special numerical tax rates applicable to certain items each default numerical tax rate and special numerical tax rate associated with at least one jurisdiction;
    determining, by the broker, a jurisdiction of the customer;
    calculating, by the broker, taxes applicable to the plurality of items responsive to the determined jurisdiction and the tax information; and
    executing, by the broker, a commerce transaction for the plurality of items using the calculated taxes.

9. The computer program product of claim 8, wherein executing the commerce transaction comprises collecting the calculated taxes.

10. The computer program product of claim 8, wherein determining the jurisdiction of the customer comprises:
    determining a shipping address for the customer.

11. The computer program product of claim 8, wherein the tax information in the virtual shopping cart comprises information describing whether a plurality of different jurisdictions collect taxes on shipping charges.

12. The computer program product of claim 8, wherein the indication information indicates to use the exception table to calculate taxes applicable to an item from the plurality of items, and calculating taxes comprises:
    calculating the taxes applicable to the item using the default tax table if the exception tax table lacks a numerical tax rate for the determined jurisdiction of the customer.

13. The computer program product of claim 8, wherein the virtual shopping cart is received from the merchant.

14. The computer program product of claim 8, wherein the virtual shopping cart is received from the customer.

15. A broker system comprising:
    one or more computer processors; and
    a non-transitory computer-readable storage medium storing computer program modules configured to execute on the one or more computer processors, the computer program modules comprising:
        a communications module for receiving a virtual shopping cart associated with a customer, the shopping cart including a plurality of items identified by the customer for purchase from a merchant separate from the broker system and tax information comprising a default tax table, an exception tax table, and indication information indicating for each of the plurality of items whether to use the default tax table or the exception tax table to calculate taxes applicable to the item, the default tax table describing default numerical tax rates applied to commerce transactions and the exception tax table describing special numerical tax rates applicable to certain items each default numerical tax rate and special numerical tax rate associated with at least one jurisdiction;
        a tax determination module for:
            determining a jurisdiction of the customer; and
            calculating taxes applicable to the plurality of items responsive to the determined jurisdiction and the tax information; and
        a transaction module for executing, by the broker, a commerce transaction for the plurality of items using the calculated taxes.

16. The broker system of claim 15, wherein the tax information comprises information describing whether a jurisdiction taxes shipping charges.

17. The broker system of claim 15, wherein the customer indicates a shipping address and wherein the tax determination module comprises:
    a jurisdiction determination module for determining the jurisdiction of the customer responsive to the indicated shipping address.

18. The broker system of claim 15, wherein the indication information indicates that the tax determination module uses the exception table to determine taxes for an item from the plurality of items, and wherein the tax determination module is adapted to use the default tax table if the exception tax table lacks a numerical tax rate for the determined jurisdiction of the customer.

19. The broker of claim 15, wherein the merchant is in a different domain than the broker system.

20. The broker system of claim 15, wherein the tax determination module comprises:
    a tax tables module for holding the default tax table and the exception table; and
    a tax calculation module for analyzing the tax information to determine whether to use the default tax table or exception table for calculating the taxes.

21. The broker system of claim 15, wherein the virtual shopping cart is received from the merchant.

22. The broker system of claim 15, wherein the virtual shopping cart is received from the customer.

* * * * *